No. 702,770. Patented June 17, 1902.
T. C. BORNMAN.
NUT LOCK.
(Application filed Jan. 25, 1902.)

(No Model.)

WITNESSES
Paul Hunter
E. R. Ferguson

INVENTOR
Thomas C. Bornman
BY
Munn
ATTORNEYS

UNITED STATES PATENT OFFICE.

THOMAS COLLINSWORTH BORNMAN, OF SUMMIT, MISSISSIPPI.

NUT-LOCK.

SPECIFICATION forming part of Letters Patent No. 702,770, dated June 17, 1902.

Application filed January 25, 1902. Serial No. 91,185. (No model.)

*To all whom it may concern:*

Be it known that I, THOMAS COLLINSWORTH BORNMAN, a citizen of the United States, and a resident of Summit, in the county of Pike and State of Mississippi, have invented a new and Improved Nut-Lock, of which the following is a full, clear, and exact description.

This invention relates to improvements in nut-locks particularly adapted for use on fish-plate bolt-nuts, although it may be used for locking bolt-nuts used in other structures; and the object is to provide a nut-lock of simple and inexpensive construction and which need not be removed to permit the tightening of a nut.

I will describe a nut-lock embodying my invention and then point out the novel features in the appended claim.

Reference is to be had to the accompanying drawings, forming a part of this specification, in which similar characters of reference indicate corresponding parts in all the figures.

Figure 1:
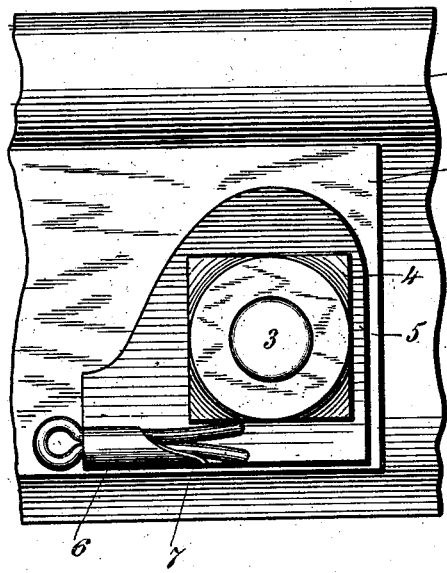
Figure 2:
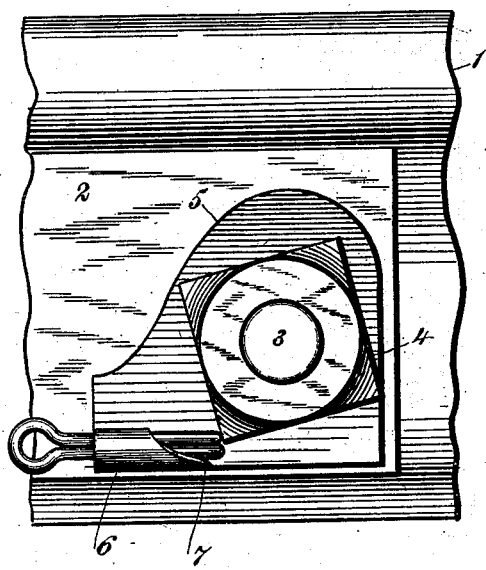
Figure 3:
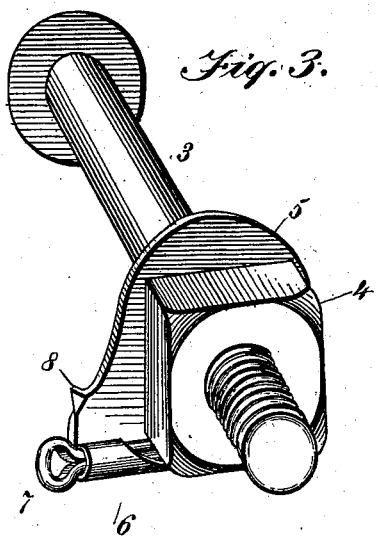

Figure 1 is a front elevation of a nut-lock embodying my invention and showing the same in locking position with a nut securing a fish-plate to a railway-rail. Fig. 2 is a similar view, but showing a part moved out by the pressure of the nut while tightening the same; and Fig. 3 is a perspective view of the device.

Referring to the drawings, 1 designates a railway-rail, and 2 a fish-plate. The bolt 3 passes through the fish-plates and the rail in the usual manner, and arranged between the nut 4 on the bolt and the fish-plate is a washer 5, which comprises a portion of the nut-lock. The bottom edge of the washer is made straight, so as to bear upon the flange of the rail or upon the flange of the fish-plates when said fish-plates are employed, and thus the washer will be prevented from turning. At one corner the metal of the washer is turned to form a tube 6, in which a cotter 7 is movable, said cotter forming the other portion of the nut-lock.

In operation after placing a nut on the bolt the cotter is to be driven in to engage against a side thereof, here shown as at the under side, and then the nut will be prevented from turning. Should a nut become slightly loose by the wearing of the bolt-head or the like, it may be turned to tighten it without removing the cotter. In other words, upon applying a wrench to the nut and turning it the corner of the nut, as indicated in Fig. 2, will engage with the end of the cotter and force it outward out of the line of movement of the nut, so that when the nut is sufficiently tightened the cotter may be again driven into place. By employing a cotter consisting of two oppositely-yielding members instead of a bolt or straight bar it is not apt to be lost, and as a whole the nut-lock can be made at a very slight expense. When the nut-lock is used in connection with a bolt and nut used in a wooden structure and in which there is no bearing-surface for the edge of the washer, a corner of the washer may be turned inward, as indicated at 8, to form a prong which may be driven into the wood.

Having thus described my invention, I claim as new and desire to secure by Letters Patent—

A nut-lock, one member of which consists of a washer having one corner portion turned to form a tube, the other member consisting of a spring-cotter movable in the tube, the inner end of the cotter when in position being arranged to be engaged by the nut to force it outward when the nut is turned for tightening, substantially as specified.

In testimony whereof I have signed my name to this specification in the presence of two subscribing witnesses.

THOMAS COLLINSWORTH BORNMAN.

Witnesses:
  E. M. CAIN,
  J. C. FORD.